J. S. BASHAW.
COMBINED SPRING AND SHOCK ABSORBER FOR VEHICLES.
APPLICATION FILED APR. 11, 1912.
1,033,657.
Patented July 23, 1912.
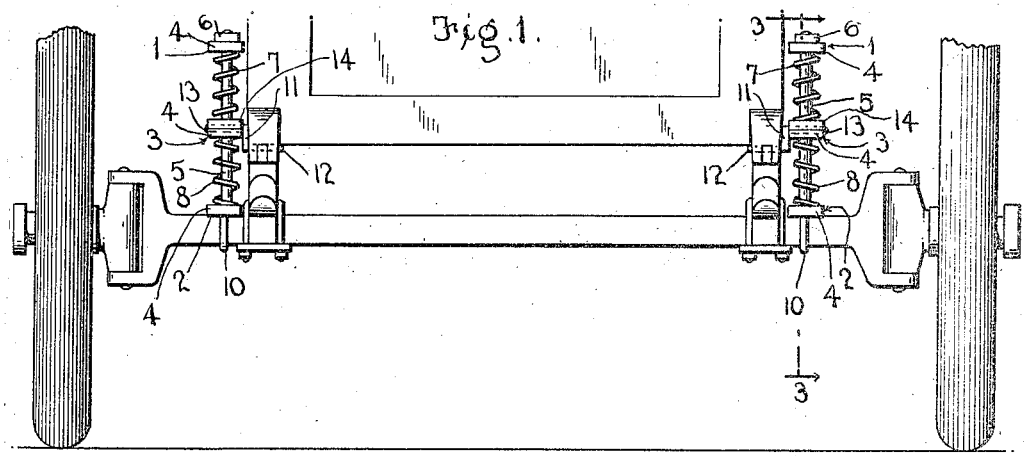
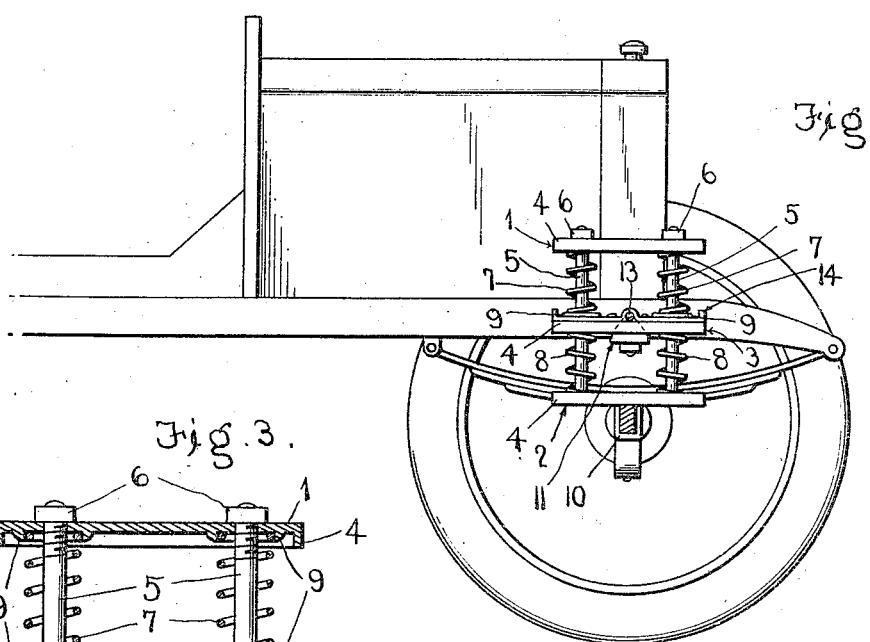
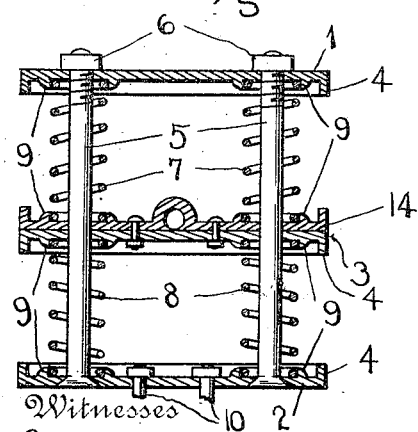
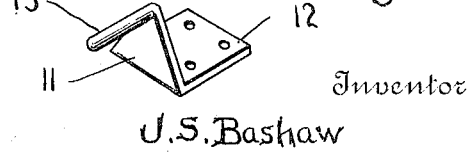
Inventor
J. S. Bashaw

UNITED STATES PATENT OFFICE.

JULIAN SEAY BASHAW, OF GAINESVILLE, FLORIDA.

COMBINED SPRING AND SHOCK-ABSORBER FOR VEHICLES.

1,033,657.

Specification of Letters Patent. Patented July 23, 1912.

Application filed April 11, 1912. Serial No. 690,079.

*To all whom it may concern:*

Be it known that I, JULIAN SEAY BASHAW, a citizen of the United States, residing at Gainesville, in the county of Alachua and State of Florida, have invented certain new and useful Improvements in Combined Springs and Shock-Absorbers for Vehicles; and I do declare the following to be a full, clear, and exact description of the invention, such as will enable others skilled in the art to which it appertains to make and use the same.

This invention relates to improvements in combined springs and shock absorbers.

One object of the invention is to provide a device of this character adapted to be interposed between the body and the axle or running gear of the vehicle whereby the body is yieldingly supported and all shocks and jars occurring from the passage of the vehicle over rough roads or obstructions will be absorbed.

Another object is to provide a spring and shock absorber which is particularly adapted for use in connection with automobiles whereby the necessity of providing pneumatic tires for the wheels thereof is obviated.

With these and other objects in view, the invention consists in certain novel features of construction, and the combination and arrangement of parts as will be more fully described and claimed.

In the accompanying drawings:—Figure 1 is a front view of a portion of the forward end of an automobile body and axle showing the application of the invention; Fig. 2 is a side view of the parts shown in Fig. 1; Fig. 3 is a vertical sectional view of the device taken on the line 3—3 of Fig. 1. Fig. 4 is a detail perspective view of the hanger for the body of the vehicle.

My improved spring and shock absorber comprises upper and lower spring confining plates 1 and 2 and an intermediate body supporting plate 3. The plates 1, 2 and 3 may be of any suitable shape but are here shown and are preferably of rectangular, oblong form and have on their edges angular flanges 4 which brace and strengthen the plates.

The plates are slidably connected near their ends by bolts 5 the lower ends of which are headed into or rigidly secured to the lower plate 2 while the threaded upper ends thereof have arranged thereon spring adjusting nuts 6 which are adapted to be screwed down onto the upper plate 1.

On the bolts between the upper plate 1 and the intermediate plate 3 are arranged an upper pair of shock absorbing springs 7, and on the bolts between the intermediate plate 3 and the lower plate 2 are arranged a pair of body supporting and shock absorbing springs 8. On the portions of the plates engaged by the springs are arranged shallow sockets 9 which are adapted to receive the ends of the springs and to hold the same in place and concentric to the bolts on which they are arranged thereby preventing the springs from rubbing against the bolts.

In applying or attaching the device to the vehicle the lower plate 2 is fastened to the axle adjacent to the side of the vehicle body by any suitable form of clip 10. The body of the vehicle is pivotally attached to or hung from the intermediate body supporting plate 3 by a hanger 11 comprising a right angularly formed body engaging plate 12 which is engaged with, and secured by screws, bolts or similar fastening devices to the side bars or any suitable parts of the body. On the upper outer edge of the plate is an outwardly projecting, right angular bearing stud 13, which is engaged with the intermediate body supporting plate and is pivotally secured thereto by a clip 14 as shown.

By arranging the springs 7 and 8 it will be seen that the weight of the vehicle body and the load therein is yieldingly supported by the lower pair of springs 8, while the upper pair of springs act as buffers and take up all recoil or prevent bouncing of the body. The springs when arranged as shown also effectively absorb all shocks and jars due to the passage of the vehicle over rough surfaces or obstructions thereby obviating the necessity of providing pneumatic tires for the vehicle wheels. By adjusting the nuts 6 the pressure or resistance of the springs 7 and 8 is regulated.

Having thus described my invention what I claim is:

A combined resilient support and shock absorber for vehicles comprising upper and lower spring retaining plates, and an intermediate body supporting plate, said plates having on their edges angular flanges whereby the plates are braced and strengthened, bolts to connect said plates, spring receiving sockets arranged on the plates around said bolts, cushioning and shock absorbing springs arranged on the bolts between said plates and having their ends engaged with said sockets, a hanger comprising a right angular plate adapted to be secured to the body of the vehicle, a stud projecting from said plate, a clip to pivotally connect said stud to said body supporting plate, and a clip to secure said lower spring retaining plate to the axle of a vehicle.

In testimony whereof I have hereunto set my hand in presence of two subscribing witnesses.

JULIAN SEAY BASHAW.

Witnesses:
W. C. ADAMSON,
S. H. WIENGES.